ent [19]  [11] Patent Number: 4,642,759
Foster  [45] Date of Patent: Feb. 10, 1987

[54] BUBBLE MEMORY DISK EMULATION SYSTEM

[75] Inventor: William R. Foster, Ottawa, Canada

[73] Assignee: Targa Electronics Systems Inc., Ottawa, Canada

[21] Appl. No.: 595,692

[22] Filed: Apr. 2, 1984

[51] Int. Cl.[4] .............................................. G06F 7/06
[52] U.S. Cl. .................................................. 364/200
[58] Field of Search ... 364/200 MS File, 900 MS File; 365/1

[56] References Cited

U.S. PATENT DOCUMENTS 4,354,225 10/1982 Frieder .............................. 364/200
4,365,294 12/1982 Stokken .............................. 364/200

Primary Examiner—Raulfe B. Zache
Assistant Examiner—Emily Yue Chan
Attorney, Agent, or Firm—Achmed N. Sadik

[57] ABSTRACT

A magnetic bubble memory based floppy disk emulating system is provided which is capable of emulating available industry standard floppy disk drives with a simple, microprocessor controlled system in which direct memory access techniques are used to free the microprocessor to perform the control functions necessary to emulate single/double density and floppy/minifloppy disks.

9 Claims, 3 Drawing Figures

BUBBLE MEMORY DISK EMULATION SYSTEM

BACKGROUND OF THE INVENTION

FIELD OF THE INVENTION

The present invention relates to digital data storage systems in general and in particular to storage systems employing magnetic bubble memory devices as storage media. More particularly still, the invention relates to bubble memory storage systems that emulate rotating magnetic disk storage devices, such as those known in the art as "floppy disk drives", in order to eliminate moving parts in operation and make the storage system suitable for hostile and mobile environments.

DESCRIPTION OF THE RELATED ART

Disk Drives

Floppy disk drives have become popular mass storage devices for micro- and minicomputer systems in the recent past. They were intended as a low cost solution to the problem of non-volatile data storage for microcomputers and now the floppy disk medium itself is a convenient means for transferring software (and data) from one computer to another. Virtually all micro- and minicomputer systems manufacturers, therefore, provide for floppy disk drives as system peripherals.

The major advantage of floppy disk drives, low cost, is outweighed for some applications by the disadvantage of insufficient reliability, particularly in harsh environments. As is well known the disk medium is continuously rotated in operation and a magnetic head is placed in contact with the disk surface and moved radially to effect data read/write operations. The moving parts wear out and go out of alignment, more so in dusty environments and due to excess vibration and shock.

The floppy disk is a circular Mylar (T.M.) "diskette" coated with iron oxide or the like magnetic medium, which is housed inside a square plastic cover. The centre of the Mylar diskette has a hole to engage a drive hub which in operation spins the diskette inside its cover. The latter has a radial aperture in order to permit access to the diskette surface by a magnetic head.

Data is recorded on the diskette in concentric circles called "tracks", each track subdivided into segments called "sectors". The disk drive has detection means for indicating when the (magnetic) head is positioned at the outermost track (track 0). A stepper motor controls the head position causing it to step from track to track. Information to locate a sector is usually written (stored) on the diskette as part of an identification header at the beginning of each data segment, this is called soft sectoring. Sector 0 is located by an index hole in the diskette and causes detection means to emit a pulse once every revolution of the diskette. Another technique of sectoring is to locate each sector with a hole in the diskette (hard sectoring), although this technique has not become the industry standard.

A track is divided into "bit cells" and one standard format is to record a clock pulse as a bit in every bit cell. This standard is called "single density encoding" and normally permits recording 128 bytes in each sector, given an 8 inch disk.

In "double density encoding" clock bits are recorded in a bit cell only when two or more consecutive data bits are zeros. Thus 256 bytes are normally recorded per sector. As a result of the different encoding there is a fundamental difference in how data is recognized by so called address marks at the beginning of a "data field". In single density an address mark consists of a single byte with three consecutive bit cells without clock bits. In double density the first three bytes have one missing clock bit per byte and the fourth byte is used for further identification purposes.

There are other variations in floppy disk drives. There are the 8 inch disk and a smaller 5.25 inch version often called "minifloppy". While the 8 inch disk has 77 tracks, the minifloppy holds either 35, 40 or 80 tracks, depending on the manufacturer. The number of sectors in the "floppy" is 26 while for the minifloppy it is normally 16, there being no industry standard.

Manufacturers of disk drives have also increased recording densities by devising the double sided diskettes, which permit use of two heads, one for each diskette side. As a result, an 8 inch double density, double sided disk can store up to 1,025,024 bytes.

The foregoing summary illustrates the variety of disk drives that must be accommodated by a successful, universal disk emulating system.

Bubble Memory

Magnetic bubble memory (MBM) devices do not require moving parts. The devices are sealed and impervious to dust, and shock and vibration do not affect them. The devices may also be used as removable media-like disks, although they are significantly bulkier and more expensive. But for some applications this is acceptable, particularly if the remainder of the micro- or minicomputer system can be used as is without modification or being specially designed for magnetic bubble media. The MBM devices themselves are commercially available, for example from INTEL Corporation, California, United States of America.

The problems facing a computer system user wishing to use bubble memory devices are not trivial. For MBM devices require specialized hardware and software, that must also be compatible with the user's particular system. This would require the user to make changes to an operating system supplied by others. For some users, a combination of regular floppy disk drives and an MBM based storage system meets with reliability requirements. For others, a system using MBM devices exclusively may be necessary to meet particularly stringent requirements. In either case, it is desirable to be able to utilize MBM devices without system modification, either in hardware or software.

In bubble memory, data is stored as magnetic domains ("bubbles") in a garnet wafer. A permanent magnetic field sustains the magnetic bubble domains once formed (generated) without external power. Storage is thus non-volatile. The solid-state nature of bubble memory obviates the need for moving parts and permits high storage density. Reliability is therefore the hallmark of MBM devices, making them desirable for use in real-time continuous process control systems as well as hostile and demanding environments.

The advantages of bubble memory obtain at the cost of unigueness. A major obstacle in its implementation is the inherently complex control requirements imposed by the nature of the medium. For instance the devices require an in-plane rotating magnetic field in order to move the bubble domains within the garnet medium and permit access to them, and the bubbles must be detected and converted to electrical impulses and vice versa.

An "Application Note" (AP-119) published by INTEL June 1981, and a "Bubble Memory Prototype Kit User's Manual" (order No.: 121685-002) explain the details necessary for using the kit (designated BPK 72) supplied by the company. The publications also explain to those skilled in the art facts about bubble memories necessary for understanding the present invention. Both publications are incorporated herein by reference.

SUMMARY OF THE INVENTION

The above mentioned prototype kit (BPK 72) interfaces an MBM module designated 7110 MBM to a microprocessor, such as INTEL's 8086. Nevertheless, the unique internal architecture of the MBM module itself remains apparent to the host system and must be accommodated as such. It is therefore a primary object of the present invention to provide an MBM system compatible with any industry standard floppy disk controller.

According to the present invention there is provided, a magnetic bubble memory (MBM) based data storage system for emulating another data storage system, comprising:
 (a) a central processor bus (CPB);
 (b) a central processor unit (CPU), an instruction memory for said CPU, and a dynamic buffer memory, all connected to said CPB;
 (c) MBM interface means for interfacing an MBM unit with said CPB;
 (d) direct bubble memory access (DMBA) means connected to said CPB for causing said MBM interface means to transfer data to selected parts of said dynamic buffer memory through said CPB;
 (e) encoder/decoder means connected to said PCB for transmitting and receiving data to and from a host system in a manner substantially identical to that of said another data storage system, said encoder/decoder means including two direct memory access (DMA) channels, one associated with transmission and the other with reception of data to and from said host system for transferring data to and from selected parts of said dynamic buffer memory through said CPB; and
 (f) said DMA channels each having registers for holding addresses to said dynamic buffer memory, said registers being updated by said CPU through said CPB without affecting ongoing data transfer to and from said dynamic buffer memory.

BRIEF DESCRIPTION OF THE DRAWINGS

The preferred embodiment of the invention will now be described in conjunction with the attached drawings, in which.

DESCRIPTION OF THE PREFERRED EMBODIMENT

Figure 1:
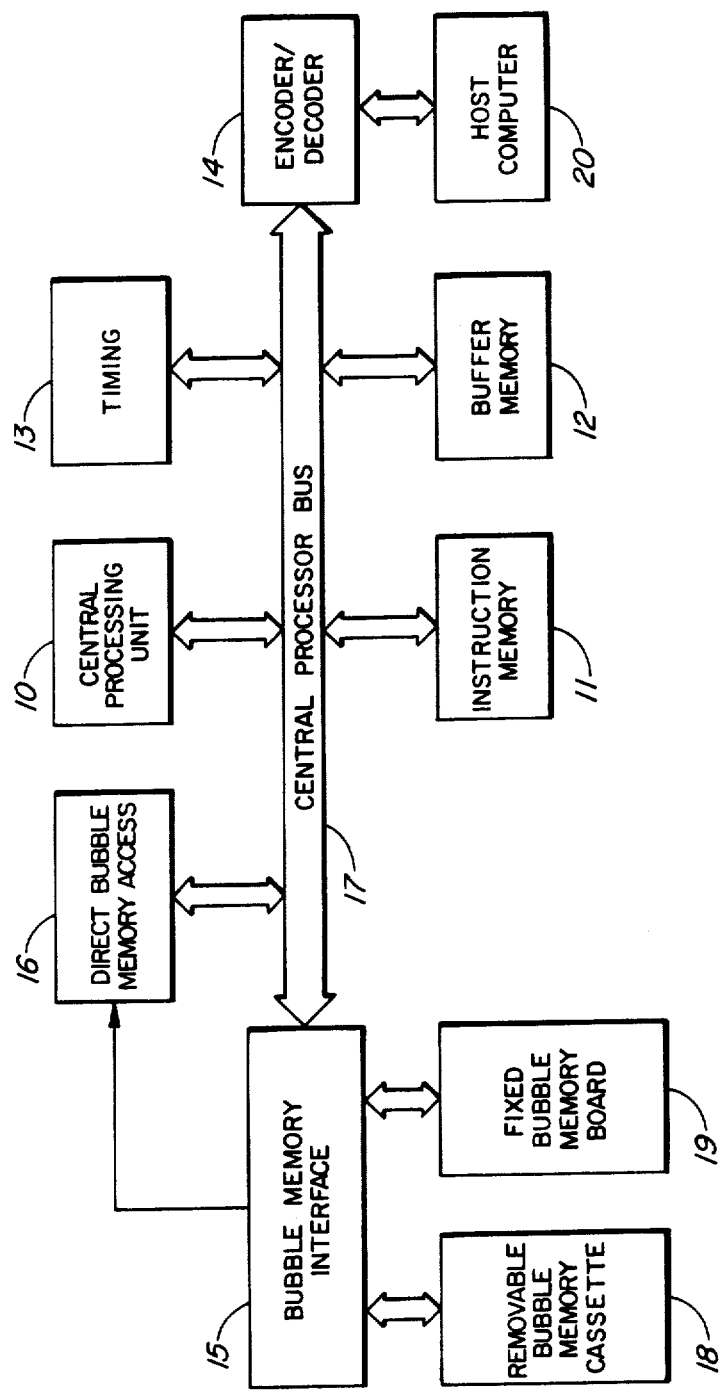
FIG. 1 is an overall block diagram of a magnetic bubble memory based floppy disk emulator system according to the present invention.

Referring to FIG. 1 of the drawings, the MBM disk emulator system comprises a local central processing unit 10 and associated instruction memory 11 and buffer memory 12, a timing unit 13, a floppy disk data encoder/decoder unit 14, a bubble memory interface unit 15, and a direct bubble memory access (DBMA) unit 16.

All these units are interconnected via a central processor bus 17, which is a conventional microprocessor bus carrying data and addresses. The bubble memory interface 15 interfaces a removable bubble memory cassette or module 18 (which corresponds to the removable disk or diskette in a floppy disk system) with the rest of the emulator system and therethrough with the host computer 20. A fixed bubble memory board 19 may be included in addition to, or instead of, the capability of the removable cassette 18. As is apparent, the host computer 20 "sees" the removable cassette 18 as a floppy disk or diskette, as the case may be, through the intermediate emulator system.

Figure 2:
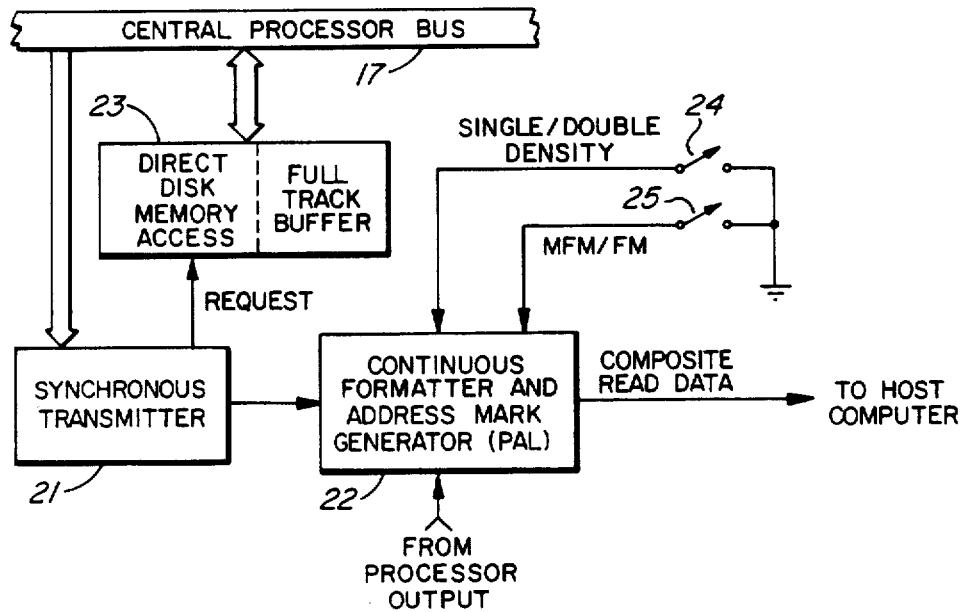
FIG. 2 is a functional block diagram of the encoder portion of the encoder/decoder in FIG. 1.

In FIG. 2, a functional block diagram of the encoder portion of the encoder/decoder 14 is shown. The encoder portion delivers to the host computer 20 a continuous stream of data identical to that would be delivered by a floppy disk. The encoder portion comprises a synchronous transmitter 21, which is fed data read out from the bubble module 18 over the central processor bus 17, and which continuously feeds data into a continuous formatter and address mark generator 22. Actually the data supplied to the synchronous transmitter 21 via the central processor bus 17 is output under control of a direct disk memory access (DDMA) unit 23 upon request by the synchronous transmitter 21 from a buffer that is associated with the DDMA unit 23. Such buffer has stored one full track (disk-track) of data at all times. DIP switches 24 and 25 program the unit 22 to format for single or double density disks, and for minifloppy marks or floppy marks, respectively. The continuous formatter unit 22 outputs a continuous stream of composite ("disk") read data to the host computer 20.

Figure 3:
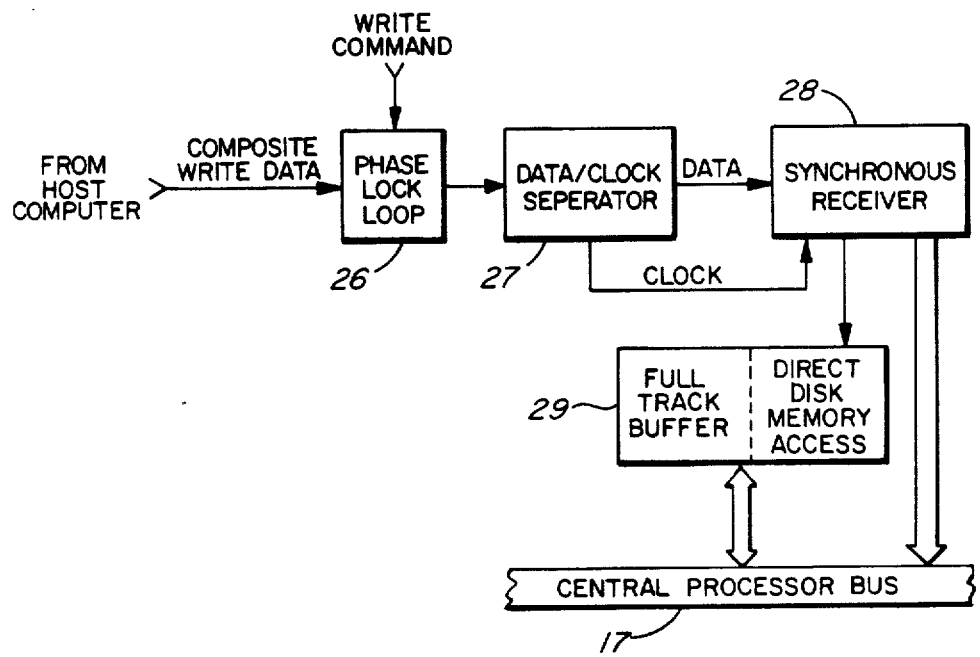
FIG. 3 is a functional block diagram of the decoder portion of the encoder/decoder in FIG. 1.

FIG. 3 shows a functional block diagram of the decoder portion of the encoder/decoder 14. As composite write data arrives from the host computer 20 the write command from the host is applied to a phase lock loop (PLL) 26 which then locks onto the incoming composite write data. The output of the PLL 26 is then applied to a data/clock separator 27, which applies the data to a synchronous receiver 28, which is clocked by the separated clock. A direct disk memory access (DDMA) unit 29 responds to the synchronous receiver 28 and causes its associated full track buffer to store the data output by the synchronous receiver 28 onto the central processor bus 17. Once the data is stored and the write command ceases, the stored data is output onto the bus 17 to be written into the bubble cassette 18.

As composite write data is received from the host computer 20, the host's write command (usually called "write gate") sets the decoder of FIG. 3 into operation as mentioned above. The synchronous receiver 28 (which could be the receive part of a commercially available universal synchronous/asynchronous receiver/transmitter or USART) hunts for the address mark in the incoming data and transfers the data through the central processor bus 17 under control of the DDMA 29 to the latter's associated full track buffers, which are actually part of the buffer memory 12. The terminal count of the DDMA 29 interrupts the CPU 10, so that the buffered data can be sent to the bubble cassette 18 as soon as the CPU 10 time permits.

The encoder of FIG. 2 on the other hand must continuously output one full (disk) track of composite read data. The synchronous transmitter 21 requests data byte-by-byte continuously from the DDMA 23 and, accordingly, receives a continuous stream of data bytes. This stream of bytes is clocked and supplied by the continuous formatter 22, which replaces every "1" in the stream by a 250 nanosecond pulse, adds in clock pulses to yield (disk) composite read data, and also removes clock pulses as required to create (disk) address marks. This is accomplished simply by programmable array logic (PAL) gates programmed by the selection switches 24 and 25. The initiation of the PAL sequence to produce an address mark is done by the CPU 10. However, the address generating PAL sequence is self-terminating. It commences again when re-initiated by the CPU 10. Depending on the selection of the DIP switches 24 and 25, data is output continuously at the rate of 125 kbps, 250 kbps or 500 kbps. Because the data rates are higher than a microprocessor such as the CPU 10 can handle continuously, the DDMA 23 is utilized in order to effect the continuous outputting of a full track of data, just as a disk drive would do. The contents of the byte and address counts of the DDMA 23 and 29 registers are updated by the CPU 10 via the CPB 17 without affecting an ongoing transfer of data to and from the buffer memory 12. Thus the DDMAs permit automatic loading of byte and address counters of the data transfer channels. The same function is performed by the DBMA unit 16, except that it controls data transfer between its buffers in the buffer memory 12 and the memory in the bubble cassette 18.

It is opportune to have a dynamic buffer memory 12 where selected parts are assigned to associated devices dynamically. Ideally, the buffer memory 12 would store not only one full disk-track, but three. It would then have stored the current track, as well as the one preceding and one succeeding it. As the host computer 20 moves from track to track, the emulator system would follow as soon as the CPU 10 time permits. Generally speaking the emulator system would be sufficiently faster than the emulated mechanical system. Although without the DMA channels, the CPU 10 would not be able to perform all its other routines and still keep step with the host system 20 as it moves from track to track, or, as the case may be, from one disk side to the other. Similar considerations apply to the question of loading new data from the buffer memory 12 into the bubble cassette 18. This would depend on how much buffer space remains available depending on how much data the host system 20 has recently written. As the available buffer space declines, the CPU 10 must give higher priority to data transfer to the bubble cassette 18. Once the basic emulator system architecture has been devised, the software details are within the grasp of those skilled in that art. The operation of the system may be enhanced by clever algorithums without changing the hardware structure of the system.

The bubble memory interface unit 15 is INTEL's integrated unit 7220 (bubble memory controller). Also the bubble cassette 18 consists of the remainder of the hereinabove mentioned kit available from INTEL. The major function of the 7220 circuit is to perform parallel/serial and serial/parallel conversion. But is also has a forty byte FIFO register which is a buffer through which data passes on its way to and from a formatter/sense amplifier (part number 7242). The primary purpose of the FIFO is to reconcile differences in timing requirements between the outside system interface (in this case the emulator system) and the 7220 interface to the 7242 amplifier. When data is to be transferred to the bubble cassette 18 through the bubble interface unit 15 upon request by the CPU 10 over the CPB 17, the interface unit 15 when ready gives a data request signal to the DMBA 16. The latter, having its address counter as well as its byte counter loaded from its updated internal registers, causes the associated buffer memory to begin transferring data via the CPB 17 into the bubble cassette 18 until the byte count in the DBMA unit 16 is reached. During this operation the remainder of the system does not intefere.

What is claimed is:

1. A magnetic bubble memory (MBM) based data storage system for emulating another data storage system, comprising:
   (a) a central processor bus (CPB);
   (b) a central processor unit (CPU), an instruction memory for said CPU, and a dynamic buffer memory, all connected to said CPB;
   (c) MBM interface means for interfacing an MBM unit with said CPB;
   (d) direct bubble memory access (DBMA) means connected to said CPB for causing said MBM interface means to transfer data from said MBM to selected parts of said dynamic buffer memory through said CPB;
   (e) encoder/decoder means connected to said CPB for transmitting and receiving data to and from a host system in a manner substantially identical to that of said another data storage system, said encoder/decoder means including two direct memory access (DMA) channels, one for transmission and the other for reception of data to and from said host system for transferring data to and from selected parts of said dynamic buffer memory through said PCB; and
   (f) said DMA channels each having registers for addressing to said dynamic buffer memory, said registers updated by said CPU through said CPB without affecting ongoing data transfers to and from said dynamic buffer memory.

2. The system of claim 1, said DBMA means being identical in function to the DMA channel.

3. The system of claim 2, said DBMA means being responsive to said MBM interface means to initiate data transfer between said MBM unit and said dynamic buffer memory.

4. The system of claim 3, said encoder/decoder means comprising a synchronous transmitter for accepting data from said dynamic buffer memory, synchronizing said data and restraining it to the host system.

5. The system of claim 4, said encoder/decoder means comprising a synchronous receiver for receiving data from said host system, synchronizing it and outputting it onto said CPB.

6. The system of claim 5, said DMA channels each being responsive to its associated synchronous transmitter or receiver for initiating reading or writing data from or into said dynamic buffer memory, respectively.

7. The system of claim 4, said another data storage system being a floppy disk drive, said synchronous transmitter retransmitting said data to a continuous formatter which formats said data according to a selected combination of the formats: single density encoding or double density encoding; and floppy or minifloppy.

8. The system of claim 5, said another data storage system being a floppy disk drive, said synchronous transmitter retransmitting said data to a continuous formatter which formats said data according to a selected combination of the formats: single density encoding or double density encoding; and floppy or minifloppy.

9. The system of claim 6, said another data storage system being a floppy disk drive, said synchronous transmitter retransmitting said data to a continuous formatter which formats said data according to a selected combination of the formats: single density encoding or double density encoding; and floppy or minifloppy.

* * * * *